United States Patent
Aljuaid et al.

(10) Patent No.: US 11,120,692 B2
(45) Date of Patent: *Sep. 14, 2021

(54) SYSTEMS AND METHODS FOR PREVENTING DAMAGE TO UNSEEN UTILITY ASSETS

(71) Applicant: Saudi Arabian Oil Company, Dhahran (SA)

(72) Inventors: Muhammad S. Aljuaid, Dhahran (SA); Mazen A. Baragaba, Dhahran (SA); Marek Zidek, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

This patent is subject to a terminal disclaimer.

(21) Appl. No.: 16/893,976

(22) Filed: Jun. 5, 2020

(65) Prior Publication Data
US 2020/0372804 A1    Nov. 26, 2020

Related U.S. Application Data

(63) Continuation of application No. 16/421,573, filed on May 24, 2019, now Pat. No. 10,748,427.

(51) Int. Cl.
*G08G 1/123* (2006.01)
*G08G 1/00* (2006.01)
(Continued)

(52) U.S. Cl.
CPC ......... *G08G 1/207* (2013.01); *G06K 9/00637* (2013.01); *G08G 1/0969* (2013.01); *H04W 4/029* (2018.02); *H04W 4/40* (2018.02)

(58) Field of Classification Search
CPC ...................................................... G08G 1/207
(Continued)

(56) References Cited

U.S. PATENT DOCUMENTS 6,282,477 B1    8/2001  Gudat et al.
6,437,726 B1 *  8/2002  Price ...................... E02F 9/245
                                                    342/175

(Continued)

OTHER PUBLICATIONS

Talmaki et al. "Geospatial databases and augmented reality visualization for improving safety in urban excavation operations." Construction Research Congress. vol. 2010. 2010. 10 pages.
(Continued)

*Primary Examiner* — Tai T Nguyen
(74) *Attorney, Agent, or Firm* — Leason Ellis LLP (57) ABSTRACT

Systems and methods are disclosed for preventing damage to underground assets caused by earth work or construction equipment and vehicles. The system includes a central data system, which has access to asset location and map data, and a GPS enabled tracking device provided in the vehicle. The system operates by comparing the real-time vehicle location to the stored asset locations, displaying the map, asset information and vehicle location to the vehicle operator and generating alerts when the vehicle breaches a perimeter around an asset. Preferably, both the central data system and the tracking unit are configured to operate together and in parallel, thereby improving the reliability of the system. In addition, the system is also specifically configured to implement various approaches for using and displaying asset location data during monitoring operations while preserving the confidentiality and security of sensitive information.

19 Claims, 8 Drawing Sheets

(51) Int. Cl.
  *H04W 4/029* (2018.01)
  *H04W 4/40* (2018.01)
  *G06K 9/00* (2006.01)
  *G08G 1/0969* (2006.01)

(58) Field of Classification Search
  USPC ......... 340/988, 994, 995.25, 539.12, 539.13, 340/539.332, 10.1; 342/42, 43, 175, 176, 342/357.2
  See application file for complete search history.

(56) References Cited

U.S. PATENT DOCUMENTS

| | | | |
|---|---|---|---|
| 6,778,128 B2* | 8/2004 | Tucker | G01V 15/00 342/175 |
| 7,372,247 B1* | 5/2008 | Giusti | G01V 15/00 324/326 |
| 7,482,973 B2 | 1/2009 | Tucker et al. | |
| 7,920,068 B2 | 4/2011 | Sawyer, Jr. et al. | |
| 8,510,141 B2 | 8/2013 | Nielsen et al. | |
| 8,749,239 B2 | 6/2014 | Nielsen | |
| 9,235,823 B2 | 1/2016 | Rushing | |
| 2002/0184235 A1* | 12/2002 | Young | G01V 1/00 |
| 2008/0133128 A1 | 6/2008 | Koch | |
| 2016/0002890 A1 | 1/2016 | Harper et al. | |
| 2017/0017010 A1* | 1/2017 | Olsson | G01V 3/02 |

OTHER PUBLICATIONS

International Search Report and Written Opinion in Corresponding PCT Application No. PCT/US2020/034237 dated Aug. 6, 2020. 12 pages.
Written Opinion of the International Preliminary Examining Authority in Corresponding PCT Application No. PCT/US2020/034237 dated Mar. 12, 2021. 8 pages.

* cited by examiner

SYSTEMS AND METHODS FOR PREVENTING DAMAGE TO UNSEEN UTILITY ASSETS

CROSS-REFERENCE TO PRIOR APPLICATION

This application is a continuation of, and claims priority from, U.S. patent application Ser. No. 16/421,573, titled SYSTEMS AND METHODS FOR PREVENTING DAMAGE TO UNSEEN UTILITY ASSETS, filed on May 24, 2019 and issued as U.S. Pat. No. 10,748,427 on Aug. 18, 2020, the contents of which is hereby incorporated by reference as if set forth in its entirety herein.

FIELD OF THE DISCLOSURE

The present disclosure relates generally to systems and methods for tracking the position of vehicles and, more particularly, to a method and apparatus for preventing damage to underground utility assets caused by excavation and construction.

BACKGROUND OF THE DISCLOSURE

A common cause of network outages is due to damage caused to underground assets, such as Fiber Optics Cable (FOC) by construction work such as excavation. Accordingly, it is desirable to implement procedures to avoid damaging unseen assets by equipment on a worksite. A common approach implemented by machine operators is to rely on physical location markers provided on-site and maps. Manual approaches, however, are inaccurate, unreliable and inconvenient. Some automated systems exist that identify the locations of underground assets within a work area, monitor the location of equipment working within the area relative to the asset location and providing asset location and proximity information to the equipment operator.

Existing systems for providing an operator with information about the location of hidden or underground assets, however, do not effectively prevent damage to underground assets in practical scenarios. For example, in some cases, due to field operations noise, an equipment operator may not hear or see alerts. In some situations, not all vehicles are equipped with a tracking unit for recording real-time equipment locations. In some situations, broadband wireless communication is not available between the in-vehicle tracking units and back-end infrastructure, which can make it difficult to obtain asset location data or provide real-time location of the equipment to a back-end system. Furthermore, existing approaches also fail to effectively monitor and guide an operator on how to avoid an asset perimeter in situations where the actual location of the underground asset or map data is intended to be kept confidential or subject to other such usage restrictions.

It is with respect to these and other considerations that the disclosure made herein is presented.

SUMMARY OF THE DISCLOSURE

According to an aspect of the present invention disclosure, a method for preventing damage to unseen utility assets by a vehicle operating in a worksite is provided. The method includes the steps of providing map data and location data for an underground asset within the worksite at a central data system and downloading the asset location and map data to a tracking device located in the vehicle.

The method also includes the tracking device monitoring a real-time vehicle location using a location sensor. In addition, the real-time location of the vehicle is received at the central data system from the tracking unit. Accordingly, the method includes the step of correlating, by each of the central data system and the tracking device, the real-time location of the vehicle with the asset location data. Thus, the each of the central data system and the tracking device respectively can detect whether the vehicle has breached a prescribed perimeter around the asset based on the correlating step. In addition, the method can include the tracking device displaying, on a visual display, the downloaded map data overlaid with the asset location data and the real-time vehicle location. The method also includes the step of generating an alert in response to one or more of the central data system and the tracking device detecting a perimeter breach and outputting the alert by the tracking device using an associated output device.

According to another aspect of the invention disclosure, a system of preventing damage to underground utility assets by a vehicle operating in a worksite. The system includes a central data system and a tracking device provided in the vehicle. More specifically, the tracking device includes a processor, a location sensing device, a computer readable storage medium, a network communications connection, a display, a user interface, and software modules that are stored in the storage medium and executable in the processor. Furthermore, the software modules include an API module that configures the processor of the tracking device to communicate with a central data system using the communications connection and download asset location and map data relating to the worksite to the storage medium. The software modules also include a monitoring module that configures the processor of the tracking device to monitor a real-time vehicle location using the location sensor during vehicle operation, correlate the real-time vehicle location with the locally stored asset location data and, based on the correlation, detect whether the vehicle has breached a perimeter around the asset. The software modules also include an alert module that configures the processor of the tracking device to display the downloaded map data overlaid with the asset location data and the real-time vehicle location on the in-vehicle display device. The alert module further configures the processor to output an alert to the operator in response to detecting a perimeter breach.

The central data system of the system similarly includes a processor, a computer readable storage medium, a network communications connection and software modules that are stored in the storage medium and executable in the processor. The software modules of the central data system include an API module that configures the central data system processor to access the asset location and map data relating to the worksite and communicate with the tracking device. The software modules of the central data system also include a monitoring module that configures the central data system processor to identify a real-time vehicle location and correlate the real-time vehicle location with the asset location data and, based on the correlation, detect whether the vehicle has breached a perimeter around the asset. In addition, the software modules of the central data system include an alert module that configures the central data system processor to generate an alert in response to detecting a perimeter breach.

These and other aspects, features, and advantages can be appreciated from the accompanying description of certain embodiments of the invention disclosure and the accompanying drawing figures and claims.

DETAILED DESCRIPTION OF CERTAIN EMBODIMENTS OF THE DISCLOSURE

Figure 1:
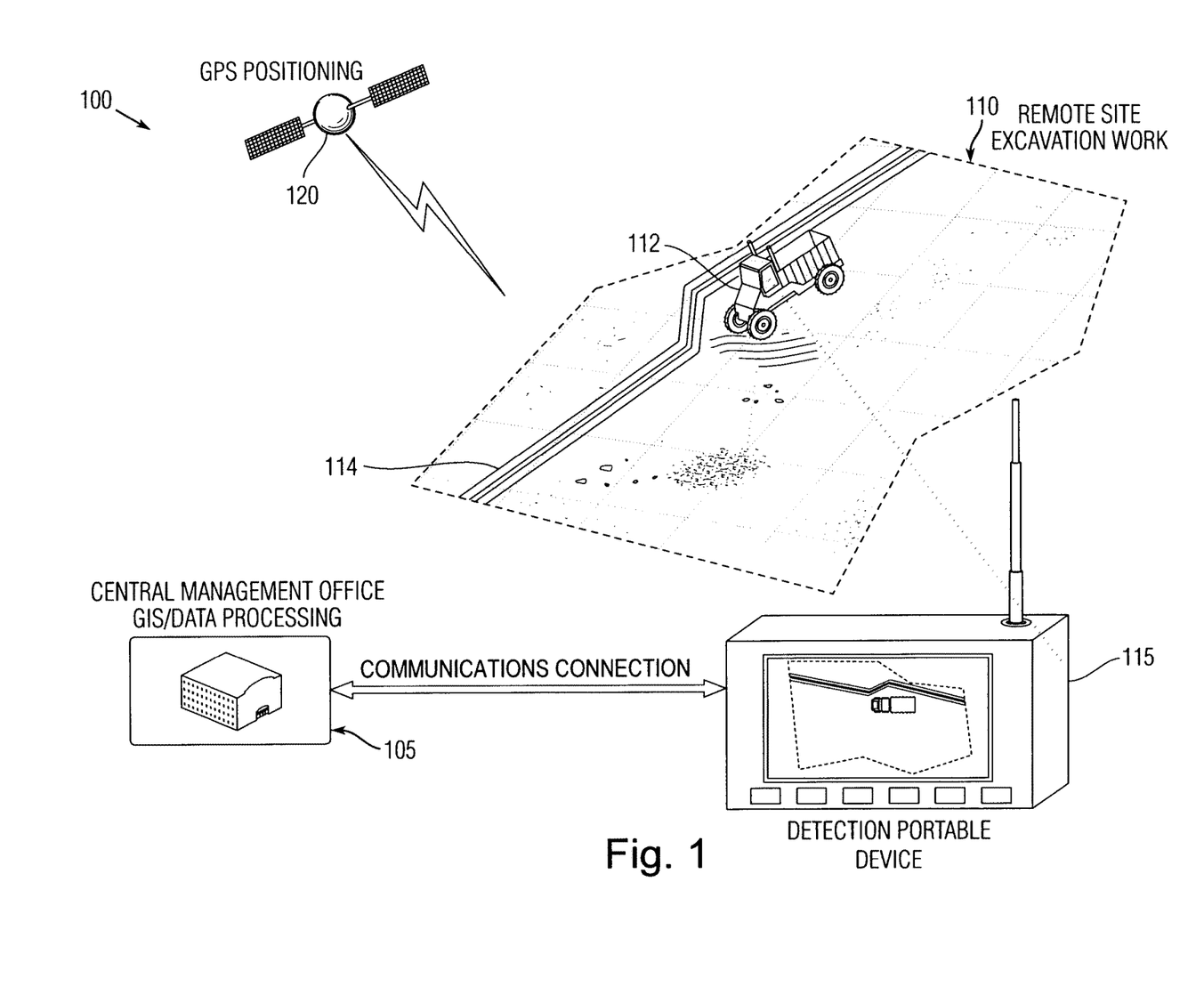
FIG. 1 is a high-level diagram illustrating an exemplary configuration of a system for preventing damage to unseen assets caused by site excavation work in accordance with one or more embodiments of the invention disclosure.

By way of overview and introduction, a system and method are disclosed for preventing damage to unseen assets caused by site excavation work. A high-level diagram illustrating an exemplary configuration of a system 100 for preventing damage to unseen assets is shown in FIG. 1. The overall system architecture comprises: a) a central data system 105, which has access to a database of asset locations, Geographic Information System ("GIS") maps and the like; and b) a mobile computing and tracking unit 115 (referred to as the "mobile tracking unit" or "tracking unit"), the display of which is shown in FIG. 1. As shown, the mobile tracking unit can be provided in a digging machine 112. The system can be used with any type of machine or vehicle that might be used at a work site (hereinafter referred to as the "vehicle"). The work site 110 ("site") can be any location in which earth working operations are being performed, such as drilling, digging, trenching, dredging, construction and the like, or any other location where vehicles are being moved and care must be taken to not disturb underground assets.

An unseen asset (not physically shown) which is typically located under the surface of the site, is preferably protected from damage by the site operations. For example, the asset can be a fiber optic cable (FOC), utility line, pipe, or some other object that is known to exist, but should not be disturbed by the on-site operations. Accordingly, in a basic configuration, the system 100 operates by one or more of the tracking unit 115 and the central data system 105 comparing a real-time location of the vehicle, which can be tracked using the tracking unit, to the known locations for underground assets. Upon detection of a perimeter breach, i.e., when the position of at least a portion of the vehicle is at or within a prescribed area around an asset, the system can be configured to generate an alert.

The system 100 can be configured to perform monitoring in various configurations. In a central-monitoring configuration the central data system 105 performs monitoring. Configurations in which the central data system is performing monitoring typically require that, a real-time location of the vehicle is sent to the central data system, which correlates the position with stored asset locations so as to detect perimeter breaches and trigger alerts accordingly. Typically, the real-time location can be sent from the in-vehicle tracking unit to the central data system over a communications network. In other implementations, information relating to the real-time location of the vehicle can be sent to the central data system via other routes. For instance, the back-end infrastructure of a GPS tracking system can send location data directly to the central data system.

In a local-monitoring configuration, the tracking unit 115 provided within the vehicle performs monitoring. To perform local monitoring, the tracking unit can download asset location information from the central data system 105 for local storage and to enable local correlation of the vehicle location to the asset locations. Local monitoring can be performed while the tracking unit is in regular communication with the central data system or in an offline mode. During regular communication, the tracking unit can be configured to relay monitoring data and/or alerts to the central data system. In the offline mode, the location and monitoring data generated by the tracking unit can be stored by the tracking unit. Accordingly, after reestablishing communication, the data can be uploaded to the central data system for recordation or further processing to verify that, while offline, no asset perimeter breaches occurred.

According to a salient aspect, the central data system 105 and the local tracking unit 115 can be configured to perform parallel monitoring. In a parallel monitoring configuration, the system 100 can more effectively predict perimeter breaches and alert the vehicle operator or other individuals accordingly. Exemplary configurations of the system 100 in which monitoring is performed by both the local and central data systems provides benefits stemming from redundant and independent monitoring. The parallel monitoring configuration increases the likelihood of preventing the asset damage and provides a system 100 that more effectively protects the assets in various real-world scenarios that would otherwise frustrate systems that perform only local or remote monitoring. For example, if the vehicle operator in the field does not see or hear an alert or if the tracking unit is offline, the central data system can assess the situation and use other communications channels (such as phone calls or alerting a nearby supervisor) to alert the operator. In another example, if the central data system has lost communication or encountered outages, the driver can still be alerted by the tracking unit operating within the vehicle.

The location of an asset can be known at varying degrees of accuracy, depending on the available information. Thus, computing device(s) that perform monitoring operations, the central data system 105 and/or the tracking unit 115, can be configured to adapt the monitoring operations to enforce varying degrees of care. For instance, in situations where the location of the asset is not known at a high degree of accuracy, the monitoring devices can define a larger virtual perimeter around the asset location. In other words, the monitoring devices can be configured to set the size of the perimeter as a function of the location data tolerance as well as a prescribed care-level associated with the asset. In addition, or alternatively, a virtual perimeter around a tracked vehicle that represents its effective size for purposes of tracking and monitoring can similarly be defined as a function of the vehicle location data or asset location data tolerances or a prescribed care-level.

Either one of the tracking unit 115 or the central data system 105 can be configured to generate notifications upon detection of a perimeter breach and output information concerning the ongoing monitoring operations. In an example embodiment, an equipment operator can be alerted of a perimeter breach using an audio output device, flashing lights and/or text-based notifications. Information such as alerts, vehicle tracking data, asset location information and map data can also be output via a display screen within the vehicle or a display screen provided at the central data system. For example, the tracking unit 115 can include a visual display and can be configured to display a GIS map of the site overlaid with the equipment and asset locations on the display. In addition or alternatively, the tracking unit 115 can include augmented reality display systems such that messages and other information can be displayed on the windshield of the vehicle or on glasses worn by the driver. Operators at the central data system 105 can similarly be presented with notifications concerning detected perimeter breaches and be provided with information about the event. Other individuals (e.g., the owners of the underground assets or site supervisors) can be notified by the system 100 in a similar fashion.

According to a salient aspect, the computing systems that perform monitoring can be configured to adapt the information that is output via the system to the vehicle operator as a function of access rules. In one or more embodiments, the tracking unit can be configured to selectively withhold or conceal sensitive asset location information or map information from the vehicle operator, for instance, due to confidentiality considerations. In other words, the system 100 can be configured to perform monitoring, provide operator guidance and perform the alerting functions in a manner that preserves the confidentiality of certain confidential information.

Maintaining confidentiality of information can be achieved by the system 100 in a variety of ways. In one or more embodiments, asset location information is only partially provided to vehicle operators as a function of an authorization level associated with the operator. For instance, the configuration data that is downloaded to the tracking unit for a particular site including, for example, the GIS map data for the site and asset location data layers, can be limited so as to not include confidential information. By way of further example, the configuration data downloaded to the tracking unit can include the confidential asset location information and used to perform monitoring, however, in the event that the operator of the vehicle has not been verified as authorized to view certain confidential asset information, the tracking unit 115 can be configured to obscure or otherwise not display visual data layers containing confidential asset information to the operator.

Figure 2:
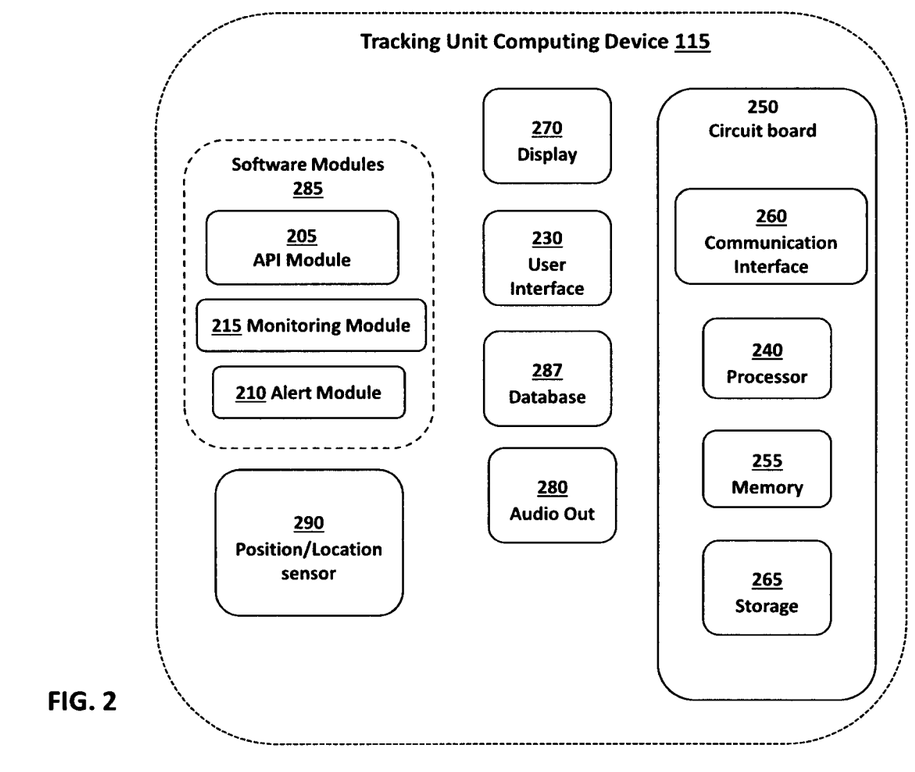
FIG. 2 is a block diagram illustrating an exemplary configuration of a tracking unit in accordance with one or more embodiments of the invention disclosure.

FIG. 2 is a block diagram illustrating an exemplary configuration of hardware and software components of the tracking unit 115. Tracking unit components include a processor 240 and a circuit board 250. The circuit board can include a memory 255, a communication interface 260 and a computer readable storage medium 265 that are accessible by the processor 240. The board 250 can also include or be coupled to a power source (not shown) for powering the device.

The processor 240 and/or circuit board 250 can also be communicatively coupled to a display 270, for visually outputting information to an operator (user), a user interface 230 for receiving operator inputs, and an audio output 280 for providing audio feedback as would be understood by those in the art. As an example, the processor 240 could emit a visual signal from the display 270, for instance, a map depicting the locations of underground assets relative to the vehicle being operated and positionally tracked.

The processor 240 and/or circuit board 250 can also be communicatively coupled to a position and location sensing device 290. In one or more embodiment, the tracking unit 115 has a GPS capability. In one or more embodiments, the tracking unit 115 can utilize other commercially available technologies such as Google Visual Positioning services capability (VPS) technology, for recognizing the environment and determining the position of a vehicle in cases where no GPS signal is available can be implemented.

Although the various components are depicted either independent from, or part of the circuit board 250, it can be appreciated that the components can be arranged in various configurations.

The processor 240 serves to execute software instructions that can be loaded into the memory. The processor 240 can be implemented using multiple processors, a multi-processor core, or some other type of processor. The memory 255 is accessible by the processor 240, thereby enabling the processor to receive and execute instructions stored on the memory and/or on the storage. Memory 255 can be implemented using, for example, a random access memory (RAM) or any other suitable volatile or non-volatile computer readable storage medium. In addition, memory 255 can be fixed or removable.

The storage medium 265 can also take various forms, depending on the particular implementation. For example, storage medium 265 can contain one or more components or devices such as a hard drive, a flash memory, a rewritable optical disk, a rewritable magnetic tape, or some combination of the above. The storage medium 265 also can be fixed or removable or remote such as cloud based data storage systems (remote memory or storage configuration not shown). The storage, for example, can be used to maintain a database, which stores information relating to the maps of the worksite and locations of assets and other data used or generated while carrying out operations and implementing aspects of the systems and methods disclosed herein.

One or more software modules 285 are encoded in the memory 255 and/or storage medium 265. The software modules can comprise one or more software programs or applications having computer program code or a set of instructions executed in the processor 240. Such computer program code or instructions for carrying out operations and implementing aspects of the systems and methods disclosed herein can be written in any combination of one or more programming languages. While software modules are stored locally in storage 265 or memory 255 and execute locally in the processor 240, the processor can interact with remotely-based computing platform via communication interface 260, and via a local or wide area network to perform the operations further described herein.

During execution of the software modules 285, the processor 240 is configured to perform the various operations of the measuring systems described herein, including without limitation, the previously described steps for comparing the real-time GPS location of the vehicle, which is tracked using the tracking unit, to the known locations for underground assets stored in a database. Upon detection of a perimeter breach, i.e., when the vehicle's position is at the location of an asset or within a prescribed proximity, the system can be configured to generate an alert.

In one or more embodiments, software modules 285 executed by the tracking unit device 115 include an API module 205, an alert module 210 and a monitoring module 215. In one or more embodiments, the API module 205 contains an interface for communicating with the central data system. In one or more embodiments, the API module 205 receives asset locations, the GIS map from the central data system and real-time location of the vehicle, among other information that can be communicated to/from other computing devices. In one or more embodiments, the monitoring module 215 detects perimeter breach through correlating the position of the vehicle with the asset locations. In one or more embodiments, the alert module 210 generates an alert of a perimeter breach.

The program code of the software modules 285/385 and one or more of the non-transitory computer readable storage devices can form a computer program product that can be manufactured and/or distributed in accordance with the present disclosure, as is known to those of ordinary skill in the art.

It should be appreciated that aspects of the tracking unit can be integrated into a single device form. Alternatively, aspects of the tracking unit can be provided as separate devices, for instance, a GPS tracking unit can be provided separate from the user-facing computing device located within the vehicle.

Figure 3:
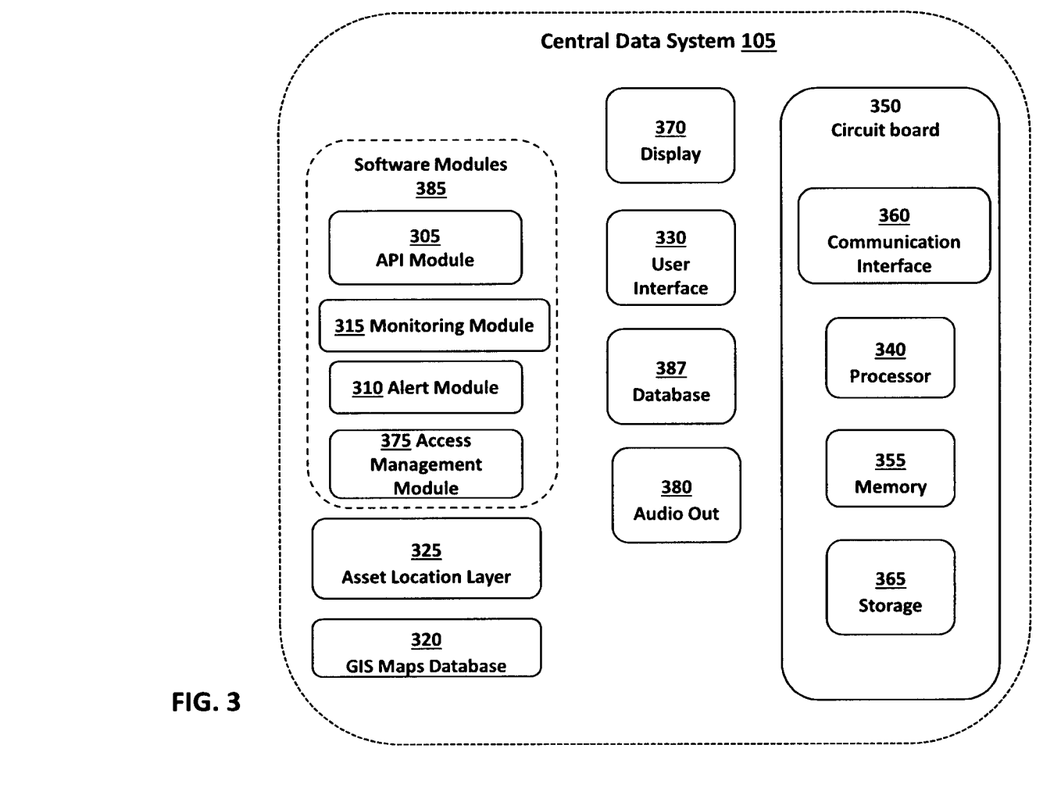
FIG. 3 is a block diagram illustrating an exemplary configuration of a central data system in accordance with one or more embodiments of the invention disclosure.

FIG. 3 is a block diagram illustrating an exemplary configuration of a central data system 105. As shown, the central data system can include similar hardware components as to those that provided in the exemplary tracking unit 115 including, a processor 340 and a memory 355, a communication interface 360, a computer readable storage medium 365 that are accessible by the processor 340. The processor 340 can also be communicatively coupled to input/output devices for receiving or outputting information to/from a system operator including, for example, a display 370, a user interface 330 and an audio output 380.

In one or more embodiments, the central data system 105 includes one or more software modules including an API module 305, a monitoring module 315 and an alert module 310. In addition, the processor of the central data system 105 can be configured to access one or more local or remote data storage locations. As shown, the data storage elements or locations can include a general database 387, an asset layer 325 and a GIS maps database 320. In one or more embodiments, the asset layer is a computer readable storage medium that contains information relating to the underground assets including asset placement information, for example, in terms of GPS coordinates, depth, orientation, type of asset, owner and the like. The GIS Maps database 320 includes map data for one or more work sites, as would be understood by those in the art. The API module 305 configures the processor to communicate with the tracking unit or other computing devices via the communication interface 360. The monitoring module 315 includes a correlation engine for comparing vehicle location data received from the tracking unit to asset location. In addition, the alert module 310 serves the purpose of generating alerts and notifications and outputting information as a function of the tracking and monitoring operations. Alerts can be output by the central data system in various ways including, via a display 370 and/or the audio output 380. Alerts can also be output in the form of messages transmitted to remote computing devices via the communication interface 360. To briefly illustrate the basic inter-operation of the modules, the API module 305 receives a real-time location of a vehicle from a tracking unit; the monitoring module 315 correlates the real-time location of the vehicle with the stored asset locations to detect perimeter breaches; and the alert module 310 generates an alert in case of a perimeter breach.

Figure 4:
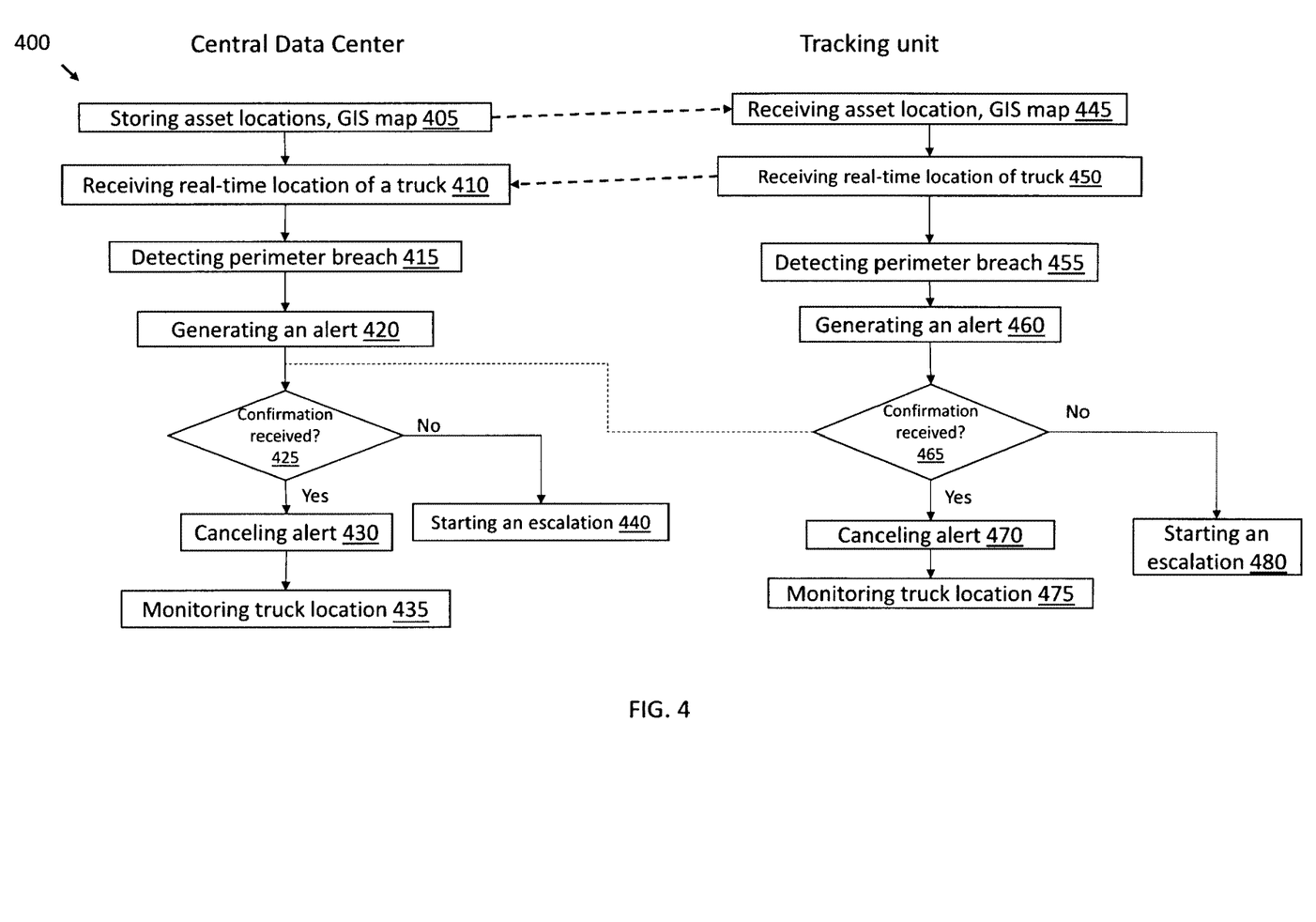
FIG. 4 is a flow diagram illustrating the process of parallel monitoring by the central data system and the tracking unit in accordance with one or more embodiments of the invention disclosure.

FIG. 4 is a flow diagram illustrating an exemplary method for asset damage prevention in accordance with one or more embodiments of the invention disclosure. More specifically, FIG. 4 describes exemplary processes performed by each of the central data system and the tracking unit in the parallel monitoring configuration.

The process begins at step 405 where location information of underground assets and site GIS map data of a site is provided at the central data system 105 and stored, for example, in the asset location storage 325 and GIS Maps database 320. At step 450, the processor 240 of the tracking unit 115, which is configured by executing the API module 205, preferably downloads configuration data comprising asset location information and GIS map data for the site from the central data system. This downloaded information can be stored in storage 265 or database 287 and can be obtained prior to and/or during operation.

At step 450, the processor 240, which is configured by executing the monitoring module 215, determines the GPS coordinate of the vehicle using the location sensor 290. As shown, the real time location can be transmitted by the tracking unit to the central data system, which receives the vehicle location information at step 410.

In some configurations, the system 100 can be configured to determine vehicle position using other commercially available position and location detection technologies, such as Google Visual Positioning services capability. These systems can operate by recognizing the environment of the site and determine the position of the vehicle and can be used in case if no GPS signal is available or no GPS tracking sensor is provided in the tracked vehicle. Other commercially available device position detection technologies can similarly be utilized.

At steps 415 and 455, respectively, each of the central data system and the tracking unit detects perimeter breaches through correlation of the real-time location of the vehicle with the underground asset locations. For instance, the tracking unit processor 240, which is configured by executing the monitoring module 215, can determine a perimeter breach through measuring the distance between the vehicle and the nearest underground utility asset(s). The central data system and/or the tracking unit can be configured to continuously or periodically correlate the vehicle location for perimeter breaches.

The central data system and the tracking unit can be configured to generate alerts when a perimeter breach is detected, at steps 420 and 460, respectively. For instance, the central data system processor 340, which is configured by executing the alert module 310 can be configured to output an alert to an operator of the central data system. Similarly, an alert generated by the alert module 210 executed by the tracking unit processor 240 can be output to the operator via an associated visual or audio output device 270 or 280 provided within the vehicle. Additionally, the central data system can send alerts to on-site computers, say, by sending an alert to the tracking unit or another mobile computing device provided on-site (e.g., the operator's smartphone or a supervisor's smartphone etc.). The tracking device 115 can also send alerts to the central data system 105. As previously noted, alerts can be sent by the tracking unit or the central data system to a third party such as a security personnel and/or supervisory personnel. As an example, alerts and notifications can include the underground asset number, the asset end points, history of the previous breaches and other characteristics.

Preferably, during operation, the tracking unit 115 is configured to receive inputs from the equipment operator in the field. More specifically, at step 465, upon the generation of a perimeter breach alert or receipt of an alert, the configured processor 240 can prompt the operator to acknowledge receipt of the alert and can receive an operator response via the user interface 230. For instance, if an alert is generated, a vehicle operator in the field should preferably confirm that he received the alert. This confirmation can be done by pressing a button on the vehicle or speaking to the vehicle or any other means. In one or more embodiments, an operator may drive the vehicle in the monitored zone just to pass-by with no intention to perform excavation/drilling work. When receiving an alert, a vehicle operator can generate different confirmations, which include, "acknowledged and we will leave", "acknowledged but passing-by with no intention for excavation work", "acknowledged, the exact location of the asset is noted, some excavation work will be performed but not approaching the asset location," and etc. At step 465, for a prescribed amount of time after an alert, the configured processor 240 can be configured to closely monitor the vehicle operation and/or wait for operator feedback, before taking further action on an alert. The further action can include dismissing the alert, at step 470, provided the vehicle has left the asset perimeter or if operator feedback relating to the perimeter breach has been received and continuing monitoring of the truck location. If, however, the perimeter breach persists and an operator response has not been received, the tracking unit can be configured to escalate the alert at step 480, as further described herein. Accordingly, if the vehicle does not move out of the perimeter of the asset within a certain time or becomes closer to the asset, then some escalation process for the alert can be performed by the system as needed.

The tracking unit can also be configured to relay the result of steps 465 (operator confirmation), 470 (alert cancellation) and 480 (escalation) to the central data system 105. Accordingly, the central data system can take similar steps for awaiting confirmation, cancelling an alert and starting an escalation at steps 425, 430 and 440, respectively.

The central data system or the tracking unit can be configured to perform escalation according to prescribed escalation rules that specify actions to be taken as a function of the alert and subsequent events. For example, escalation rules can specify to whom the alerts should be transmitted to, under what conditions the escalation should happen, and what additional actions should be taken and when. By way of further example, the escalation rules can provide the prescribed period of time within which a vehicle operator must respond to an alert using a user-interface.

As previously noted, during operation of the system 100, the on-board tracking unit 115 can be configured to display map information, vehicle location information and asset location information to an operator on the display 270. For instance, the tracking unit can assist the operator by displaying a visual map of the site overlaid with the real-time vehicle position, the location of underground assets and any virtual perimeters or supplemental information relating to the assets. This information can be displayed during operation (e.g., continuously) or under specific circumstances, say, when the vehicle is detected as possibly approaching an asset location or has breached the perimeter of an asset. In addition, in one or more embodiments, the tracking unit can be configured to selectively withhold or conceal sensitive asset location information or map information from the vehicle operator, for instance, due to confidentiality considerations. In other words, the system 100 can be configured to perform monitoring, provide real-time map and location information and perform the alerting functions in a manner that preserves the confidentiality of certain confidential information.

Figure 5:
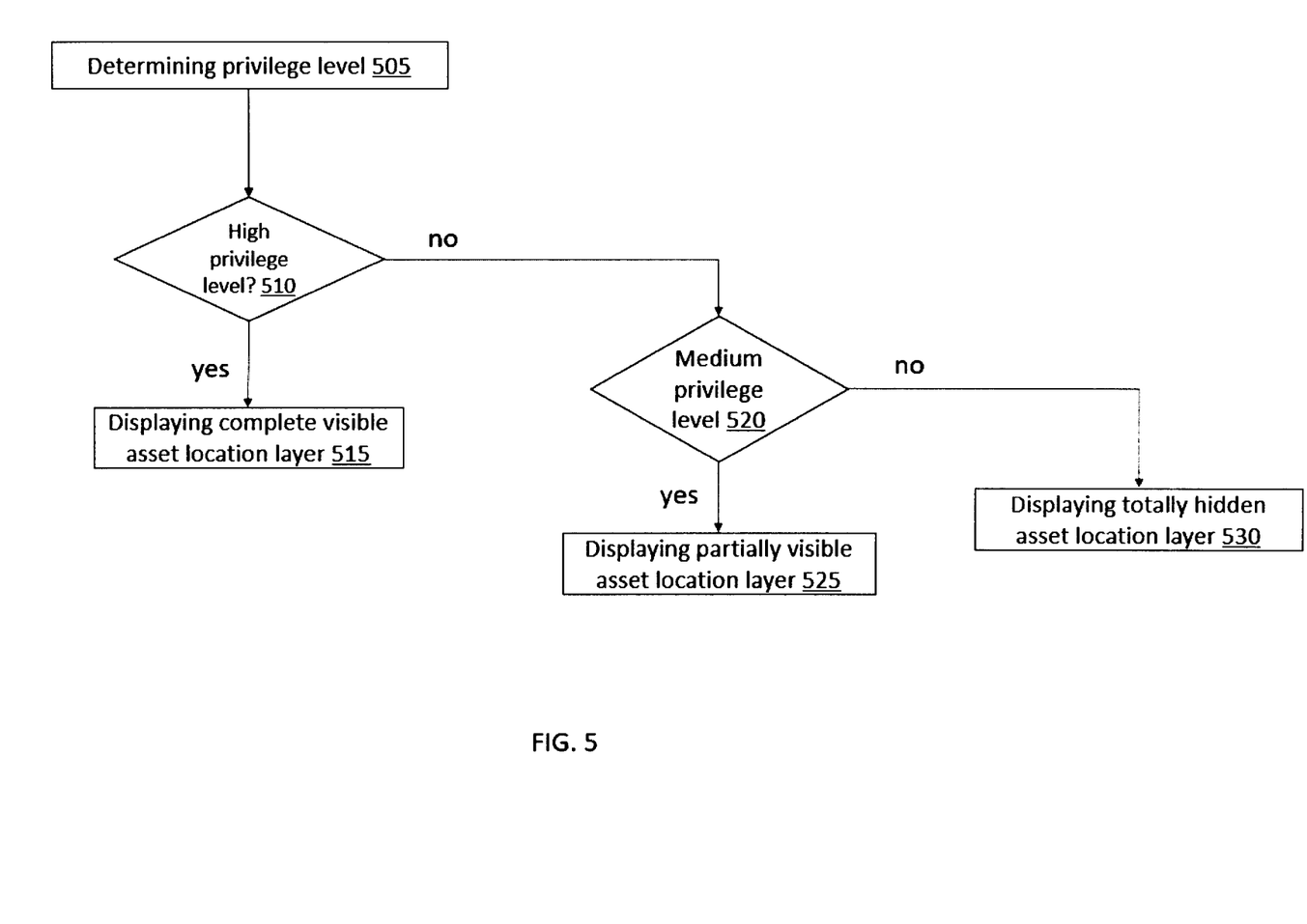
FIG. 5 is a flow diagram illustrating the process of managing access to asset location information in accordance with one or more embodiments of the invention disclosure.

FIG. 5 is a flow diagram illustrating an exemplary method of managing access to asset location information by the system 100. The process begins at step 505, where the privilege level of the vehicle operator is determined. More specifically, step 505 can include one or more of the tracking device 115 and the central data system 105 authenticating the operator. Step 505 can also include determining the user's level of access or "privilege level." As shown in FIG. 3, the central data system 105 can include an access management module for authenticating and managing access rules. However, while not shown in FIG. 2, it should be understood that various features and functionality provided by the access management module can similarly be implemented by an access management module provided in the tracking unit in order to enable access management in the absence of connectivity between the tracking device 115 and the central data system 105.

The access management module and Two Factor Authentication (2FA) can be used to protect the confidentiality and integrity of the system. Also, it can be used to determine the privilege level of the field vehicle drivers/operators, the central data system operators and the system administrators. As such, each individual can be provided with specific privileges to access asset location information based on his/her role, responsibility and authorizations and these privileges can be recorded using the access management module 375.

In one exemplary configuration, the vehicle operator can be prompted to login by the tracking unit 115 and the login can be verified by the tracking unit in view of information stored by the access management module 375. Monitoring center operator or other systems administrator can be similarly authenticated by the central data system 105. As further described herein, each operator can be provided with access privileges stored, for example, by the access management module 375 in a database or locally by the tracking device. Privileges serve to define the extent to which an operator can access certain GIS map data and the database of asset information. Thus, as further described herein, transactions performed by the system 100 for a given system user can be based on a respective privilege level and user authorization.

Accordingly, at steps 510 and 520, a user's privilege level is determined and, at steps 515, 525 and 530, information is provided to the user as a function of the privilege level. For instance, the processor 340 of the tracking unit 115, which is configured by executing the access control module 375, can be configured to determine the operator's privilege level. Furthermore, the processor 340, which is configured by executing one or more of the API module 305, the monitoring module 315 and the alert module 310, can be configured to selectively download and/or output the map and asset information used for monitoring as a function of the determined privilege level.

In one or more embodiments in which local monitoring is performed, an operator can be assigned privileges to download asset and GIS map data to the tracking unit 115 without restriction. However, the tracking unit can be configured to locally enforce rules that protect the confidentiality of information which the operator is not authorized to view, for example, by not displaying the confidential GIS or asset data layers to the operator. As can be appreciated, downloading detailed confidential asset location information enables the tracking system to most effectively prevent asset damage, while preventing the output of the confidential information to the operator serves to protect confidential data.

Granular authorization and selective display of confidential data can also involve granting limited access to the operator of only segments of the confidential asset data based on the vehicle location and time. Similarly, any such temporary authorization can be expired in the event the vehicle moves away from the area, for example.

In one or more embodiments, when an operator has a high privilege level, the tracking device 115 can provide the operator complete visibility on the asset location layer (step 515). By comparison, when the operator has a low privilege level, the tracking device can be configured to selectively output non-confidential information such that the operator cannot see asset location layer at all (step 530). By way of further example, when the operator has a medium privilege level, the tracking unit can be configured to provide the operator a limited view of confidential layers based on the GPS coordinates of the tracking unit (step 525). Furthermore, as the vehicle moves, the displayed zone of asset location is refreshed accordingly.

In one or more implementations, the display mode implemented by the tracking device 115 can be controlled by the authentication process and locally stored configuration parameters. For example, the tracking device can be configured to totally hide the asset location layer for a given operator, but display the complete asset location for another operator, based on their respective privileges. The tracking device 115 can be configured to receive the configuration parameters from a remote administrator or provide an interface for the configuration parameters to be defined using an administrator account and then lock the configuration parameters such that operators do not have access to alter the configuration parameters.

In one or more embodiments, the tracking device can implement an incremental data download approach so as to minimize the amount of data that could be potentially exposed. For instance, if an asset location is confidential and the wireless connectivity is stable and adequate, the tracking device can be configured to download subsets of the asset location data on an as needed basis based on the zone the vehicle is in. Preferably, not all of the data in the zone will be downloaded except for the needed portion of the data. In such a configuration, the tracking device can be configured to refresh the data based on the movement of the vehicle. Accordingly, data can be downloaded on an as-needed basis, then, downloaded data can be selectively displayed to further protect its confidentiality while still facilitating effective damage prevention (e.g., totally visible, partially visible or totally hidden).

In one or more implementations, the tracking device 115 can be configured to continuously assess the need for the already downloaded data. Furthermore, some of the already downloaded asset location data can be automatically deleted if it is not needed anymore. For instance, if the tracking device determines from the real-time vehicle location data that the vehicle has moved to another area, then the FOC data related to that area can be automatically deleted from the local device storage. The deletion operation can be dependent on the location and speed of the truck. In summary, the tracking device can be configured to implement a conditional but incremental data download approach and, on the other hand, can implement continuous data assessment and cleaning functions. Furthermore, in one or more implementations, depending on confidentiality level, data exchanged between the central data system and tracking unit can be encrypted during transmission and/or at rest and stored in encrypted format.

As previously discussed, the exemplary systems and methods for preventing damage to underground assets incorporate distributed architecture and monitoring process that enable the system to adapt to various practical scenarios and related challenges. While operations of the system 100 comprising an in-vehicle tracking device 115 and a central data system 105 that are in broadband wireless communication is shown and described in connection with FIG. 4, exemplary configurations of the system 100 and methods of operation adapted to various practical scenarios are shown and described in connection with FIGS. 6-8.

Figure 6:
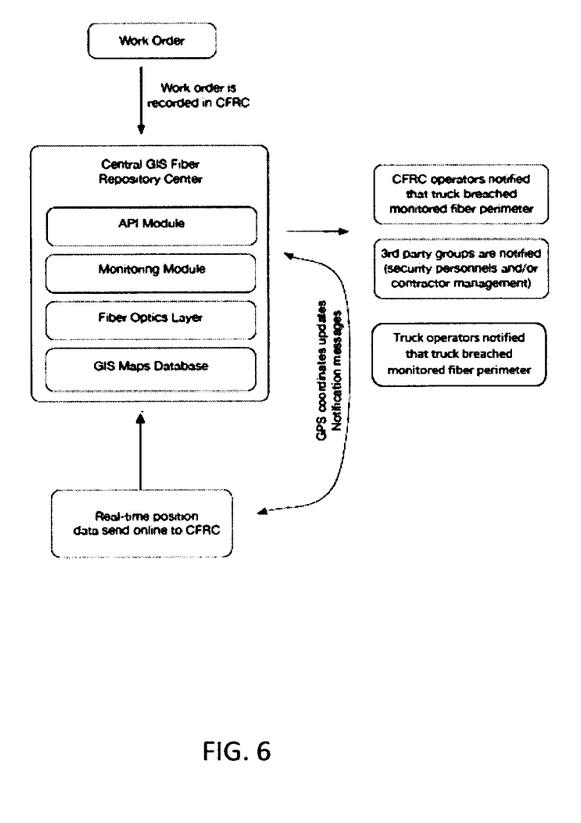
FIG. 6 is a hybrid system and process flow diagram illustrating an exemplary configuration of a system for preventing damage to unseen assets in accordance with one or more embodiments of the invention disclosure.

FIG. 6 is hybrid system diagram and flow-diagram illustrating the operation of an exemplary system for avoiding damage to an underground asset in accordance with one or more embodiments of the invention disclosure. FIG. 6 illustrates an exemplary method for preventing damage to an underground asset in the scenario where no tracking unit is available in the vehicle, but broadband wireless communication is available and a central data system is available to perform monitoring.

More specifically, the central data system is configured to detect the real-time location of the vehicle and correlates the vehicle location with location of underground utility assets so as to generate alerts. Since the tracking unit is not available in this particular scenario, the central data system can be configured to monitor the location of the vehicle through means other than a real-time vehicle location received from an in-vehicle tracking unit. For instance, detection of the vehicle position can be by the known automatic vehicle locator ("AVL") over satellite technology. In addition or alternatively, detection of the vehicle can be performed using on-site cameras with zone detection capabilities monitoring the corridor of the underground assets. By way of further example, the vehicle operator can have a smartphone configured to take GPS-enabled pictures or video of the vehicle and transmit the images to the central data system for processing. More specifically, the central data system can analyze the pictures' details including the embedded picture GPS coordinate to determine whether a perimeter breach event has occurred and whether the vehicle driver should be alerted to any underground asset in the area. Alternatively, the mobile device can simply communicate a real time location of the device to the central data system. Accordingly, it can be appreciated that, a mobile phone used by the vehicle operator can be a fully functioning substitute for a dedicated tracking unit 115 provided in a vehicle. In addition, the central data system operator can alert the vehicle driver by phone calls, SMS or a dedicated damage prevention application installed and executing in the mobile phone. In addition or alternatively to the foregoing location detection approaches, other people at the job site can similarly use their mobile phones to capture geo-tagged images or videos of the vehicle nearby and transmit those to the central data system through an application for use in monitoring operations.

After receiving real-time location of the vehicle, the central data system determines perimeter breach through correlating the real-time location of the vehicle with locations of underground assets. Moreover, upon detecting perimeter breach, the central data system can be configured to notify a third-party group. The system can similarly send alerts to mobile phones of the operator or other on-site personnel. In addition, the central data system can send audio alerts and visual alerts (e.g., flashing lights) for output using speakers and visual output devices installed and available on-site, for instance, to alert the vehicle operator. In addition or alternatively, after detecting perimeter breach, the central data system can be configured to provide alerts to central data system operators.

Figure 7:
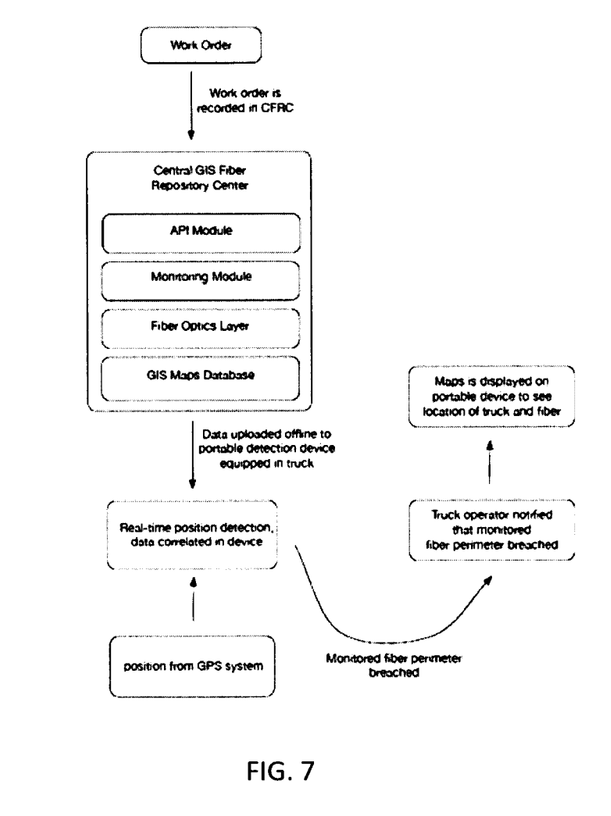
FIG. 7 is a hybrid system and process flow diagram illustrating an exemplary configuration of a system for preventing damage to unseen assets in accordance with one or more embodiments of the invention disclosure.

FIG. 7 is hybrid system diagram and flow-diagram illustrating the operation of an exemplary system for avoiding damage to an underground asset in accordance with one or more embodiments of the invention disclosure. FIG. 7 illustrates an exemplary method for preventing damage to an underground asset in the scenario where a tracking device is available in an on-site vehicle, broadband wireless communication is not available between the central data system and the tracking device or other mobile devices. In this exemplary scenario, central data system monitoring remains available but without the benefit of communication with the tracking unit.

In such a scenario, the tracking unit can be configured to download location information of underground assets from the central data system before going onsite. Accordingly, when the vehicle is roaming around the worksite, the tracking unit can be configured to detect the location of the vehicle using a GPS location sensor, for example. In addition or alternatively, the tracking unit can be equipped with commercially available technologies for recognizing the environment and determining the vehicle position. An example of such a technology includes the Google Visual Positioning services capability (VPS), which can also be used to guide the driver on the appropriate driving direction to avoid an underground asset.

In addition, the vehicle location can be determined by the central data system using, for example, AVL over satellite. In this case, the perimeter around an asset can be made larger in order to compensate for the delay in satellite communication and avoiding the truck reaching to the asset before the processing results are communicated to the truck driver or third parties. In addition or alternatively, cameras, radar, acoustic sensors can be installed in the area along the corridor of the underground assets. Distances between these cameras or sensor depends on how far they can detect, however, the cameras, radar, and acoustic sensors can be equipped with microwave links or wired links for communicating the measured information to the central data system.

As previously discussed, the tracking unit detects a perimeter breach through correlating the real-time vehicle location with underground asset locations and alerts and advises vehicle operator when a perimeter breach is detected. The central data system can determine the location of the vehicle from the AVL or sensor data, correlate the location information with stored asset locations and generate alerts and notifications accordingly.

In addition, in some configurations, the tracking device can also be configured to store a history of vehicle events such as the log of GPS coordinates of the vehicle while the tracking unit has no network connectivity and upload this information to the central data system upon reestablishing connectivity. Once the history of the vehicle events is uploaded to the central data system, the correlation/analytics engine can analyze the data and generate alerts and notifications, say, to instruct a supervisor to investigate and take proper actions.

Figure 8:
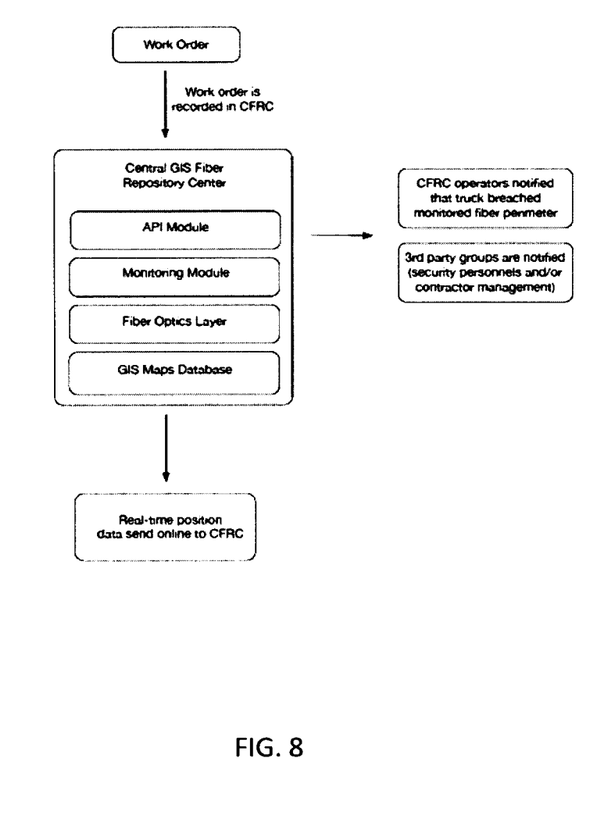
FIG. 8 is a hybrid system and process flow diagram illustrating an exemplary configuration of a system for preventing damage to unseen assets in accordance with one or more embodiments of the invention disclosure.

FIG. 8 is hybrid system diagram and flow-diagram illustrating the operation of an exemplary system for avoiding damage to an underground asset in accordance with one or more embodiments of the invention disclosure. FIG. 8 illustrates an exemplary method for preventing damage to an underground asset in the scenario where a central data system for monitoring is available, however, a tracking unit is not provided in the on-site vehicle and broadband wireless communication is not available between the central data system and the vehicle. This scenario may occur, for example, if a vehicle operating at the worksite does not belong to the entity tasked with monitoring the worksite.

In such a scenario, the central data system can be configured to detect the location of the vehicle. Vehicle location detection can be performed using a variety of available technologies. An AVL over satellite location tracking systems can be used, wherein all trucks in the region have AVL equipment by regulation, for example. By way of further example, at least one camera with zone detection capability monitoring the corridor of the underground asset can be used. By way of further example, one or more sensors can be provided near the FOC and monitored by the central data system, such as an acoustic sensor identifying the noise created by vehicles in the area. By way of further example, the system can include drones patrolling the area, wherein a camera in the drone sends a video stream including GPS coordinate information such as a geo-tagged video stream to the central data system, which can process the video with recognition capabilities to determine if there is any vehicle close by the corridors of the underground assets. In addition or alternatively, video processing can occur in the drone if there is an aerial platform in the drone. Accordingly, if a vehicle is recognized in the video, at least the portion of the video containing the vehicle can be sent to the central data system to validate and take further actions, say, 1) sending a message to the security guard in the area, and 2) sending an alert command to a stationary speaker installed in the field.

In addition or alternatively, satellite video streaming can be used. More specifically, a camera in the satellite can send a video stream to the central data system, which can process the video with recognition capabilities to determine if there is any vehicle close by the corridors of the underground assets. As noted in the drone example, the video can also be first processed in the satellite and only video of detected vehicles is sent to the data center to reduce the amount of data traffic. Accordingly, if a vehicle is recognized in the video, at least the portion of the video containing the vehicle can be sent to the central data system to validate and take further actions, say, 1) sending a message to the security guard in the area, and 2) sending an alert command to a stationary speaker installed in the field. Any one or more of the aforementioned vehicle location detection methods can be used to provide vehicle location data to the central data system.

In addition, as previously discussed, the central data system performs monitoring by correlating the determined real-time location of the vehicle with locations of underground assets to detect perimeter breach. Furthermore, when a perimeter breach is detected, the central data system can implement any of the previously discussed responsive actions including, for example, sending alerts and actions to third-parties, alerting the central data system operators, outputting audio and visual alerts (e.g., via speakers or lights or displays installed on-site) to alert the vehicle operator. By way of further example, when a perimeter breach is detected, the drone can approach the vehicle and alert the driver via speakers that can transmit voice messages from the central data system or play preloaded messages.

At this juncture, it should be noted that although much of the foregoing description has been directed to systems and methods for avoiding damage to underground assets, the systems and methods disclosed herein can be similarly deployed and/or implemented in scenarios, situations, and settings far beyond the referenced scenarios.

It should be appreciated that more or fewer operations can be performed than shown in the figures and described. These operations can also be performed in a different order than those described. It is to be understood that like numerals in the drawings represent like elements through the several figures, and that not all components and/or steps described and illustrated with reference to the figures are required for all embodiments or arrangements.

Thus, illustrative embodiments and arrangements of the present systems and methods provide a system and a computer implemented method, computer system, and computer program product for wirelessly configuring field devices. The flowchart and block diagrams in the figures illustrate the architecture, functionality, and operation of possible implementations of systems, methods and computer program products according to various embodiments and arrangements. In this regard, each block in the flowchart or block diagrams can represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

The subject matter described above is provided by way of illustration only and should not be construed as limiting. Various modifications and changes can be made to the subject matter described herein without following the example embodiments and applications illustrated and described, and without departing from the true spirit and scope of the present disclosure, which is set forth in the following claims.

What is claimed:

1. A method for preventing damage to unseen utility assets by a vehicle operating in a worksite, comprising:
   providing, at a central data system, map data and location data for an underground asset within the worksite;
   downloading, to a tracking device located in the vehicle, the asset location and map data;
   monitoring, by the tracking device using a location sensor, a real-time vehicle location, wherein the real-time vehicle location is monitored on an ongoing basis during operation of the vehicle;
   correlating, by one or more of the central data system and the tracking device, the real-time location of the vehicle with the asset location data; and
   displaying, by the tracking device on a visual display, the downloaded map data overlaid with the asset location data and the real-time vehicle location, wherein information displayed using the display, including one or more of the downloaded map data and the asset location data, is displayed as a function of a confidentiality of the data.

2. The method of claim 1, further comprising:
   detecting, by at least one of the central data system and the tracking device, whether the vehicle has breached a prescribed perimeter around the asset based on the correlating step;
   generating an alert in response to one or more of the central data system and the tracking device detecting a perimeter breach; and
   outputting the alert by the tracking device via an associated output device.

3. The method of claim 1, wherein only a portion of the asset location and map data is downloaded to the tracking device as a function of the confidentiality of the data.

4. The method of claim 3, wherein the portion of the asset location and map data covers only a sub-area of the worksite in which the vehicle is operating in.

5. The method of claim 4, further comprising:
   repeating the downloading step in response to the tracking device detecting movement of the vehicle into an area of the worksite not covered by the previously downloaded asset location and map data; and
   deleting, by the tracking device, confidential subsets of the previously downloaded portion of data.

6. The method of claim 1,
   wherein only a subset of the asset location and map data is displayed as a function of the confidentiality associated with the data.

7. The method of claim 1, further comprising:
   determining, with the tracking device, a level of access for a user of the vehicle; and
   selectively displaying the downloaded asset location and map data as a function of confidentiality and the level of access.

8. The method of claim 1, further comprising:
   wherein the downloaded asset location and map data comprises confidential information and non-confidential information and wherein the step of displaying information as a function of the confidentiality of the data comprises displaying non-confidential information on the display and, for information containing confidential information:
   obscuring visual data containing confidential information on the display,
   not displaying visual data containing confidential information, and
   selectively displaying the visual data containing confidential information.

9. A system of preventing damage to underground utility assets by a vehicle operating in a worksite, comprising:
a central data system; and
a tracking device provided in the vehicle, the tracking device including a processor, a location sensing device, a computer readable storage medium, a network communications connection, a display, a user interface, and software modules that are stored in the storage medium and executable in the processor, wherein the software modules include:
an application programming interface module that configures the processor of the tracking device to communicate with the central data system using the network communication connection and download asset location and map data relating to the worksite to the storage medium,
a monitoring module that configures the processor of the tracking device to monitor a real-time vehicle location using the location sensor during vehicle operation, and
an alert module that configures the processor of the tracking device to display the downloaded map data overlaid with the asset location data and the real-time vehicle location on the display device, and wherein information displayed using the display, including one or more of the downloaded map data and the asset location data, is displayed as a function of a confidentiality of the data,
wherein the central data system includes a processor, a computer readable storage medium, a network communications connection and software modules that are stored in the storage medium and executable in the processor, wherein the software modules include:
an application programming interface module that configures the central data system processor to access the asset location and map data relating to the worksite and communicate with the tracking device, and
wherein the central data system, the tracking device, or both are further configured to correlate the real-time vehicle location with the asset location data to detect whether the vehicle has breached a perimeter around the asset, and
wherein the central data system, the tracking device, or both are further configured to limit information output using the display, including one or more of the downloaded map data and the asset location data as a function of a confidentiality of the data.

10. The system of claim 9, wherein the monitoring module further configures the tracking device processor to generate an alert in response to detection of the perimeter breach.

11. The system of claim 9, further comprising an access management module that further configures the tracking device processor to download only a portion of available asset location and map data to the storage medium as a function of the confidentiality of the data.

12. The system of claim 11, wherein the downloaded portion of the asset location and map data covers only a sub-area of the worksite in which the vehicle is operating in.

13. The system of claim 11, wherein the application programming interface module configures the tracking device processor to, in response to movement of the vehicle into an area of the worksite not covered by the previously downloaded asset location and map data, download additional asset location and map data and delete confidential subsets of the previously downloaded asset location and map data.

14. The system of claim 9, further comprising an access management module that configures the tracking device to display only a subset of the asset location and map data as a function of a confidentiality associated with the asset location data.

15. The system of claim 9, further comprising an access management module that configures the tracking device processor to determine a level of access for an operator of the vehicle and further configures the tracking device to selectively display the downloaded asset location and map data as a function of the level of access and a confidentiality of the asset location and map data.

16. The system of claim 15, wherein the tracking device processor determines the level of access for the operator using an authentication module provided at the central data system.

17. The system of claim 15, wherein for a user having a first access level, the tracking device is configured to display confidential information, wherein for a user having a second access level, the tracking device is configured to display non-confidential information and withhold confidential information from display, and wherein for a user having a third access level, the tracking device is configured to display non-confidential information and a limited amount of confidential information.

18. The system of claim 9, wherein the downloaded asset location and map data comprises confidential information and non-confidential information, and wherein an access management module configures the tracking device processor to limit display of confidential information based on one or more of vehicle location, time and a level of access for a user of the vehicle.

19. The system of claim 9, wherein the downloaded asset location and map data comprises confidential information and non-confidential information and wherein the correlating step is performed using the confidential information, and
wherein, for visual data containing confidential information, the tracking device is configured to one or more of:
obscure the visual data containing confidential information on the display,
not display the visual data containing confidential information, and
selectively display the visual data containing confidential information.

* * * * *